July 21, 1931.　　　J. R. ALBERS ET AL　　　1,815,489
AIR FOIL LIFT CONTROL
Filed Sept. 2, 1930
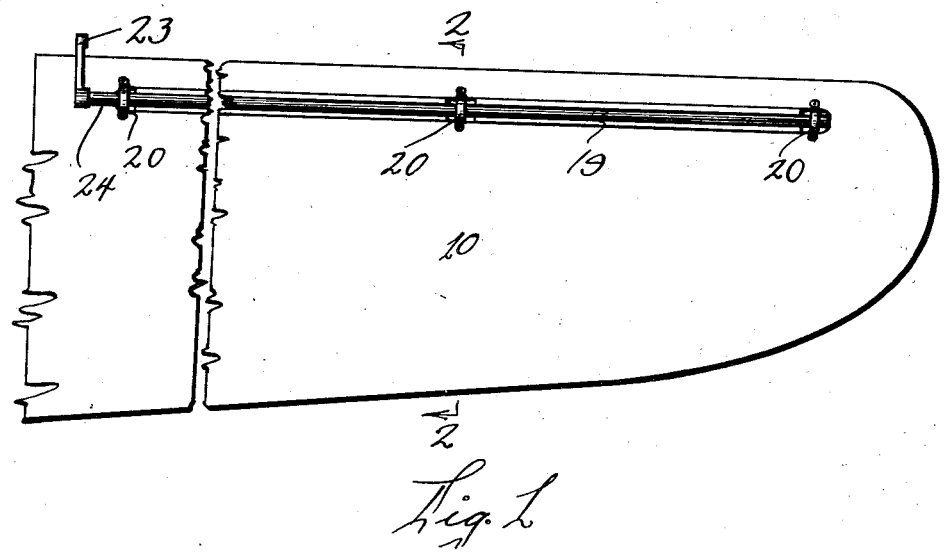
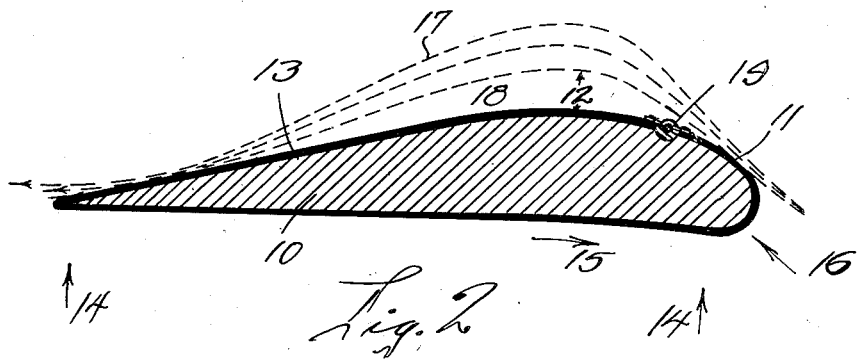
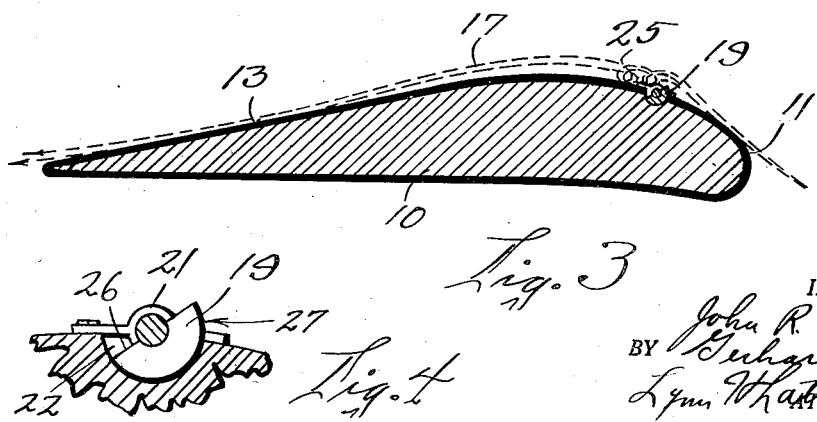
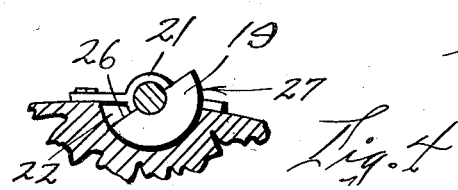
INVENTORS
John R. Albers
BY Gerhard Walber
ATTORNEYS Patented July 21, 1931

1,815,489

UNITED STATES PATENT OFFICE

JOHN R. ALBERS AND GERHARD H. ALBERS, OF CHEROKEE, IOWA

AIR FOIL LIFT CONTROL

Application filed September 2, 1930. Serial No. 479,152.

Our invention relates to the controlling of the lift on an air foil surface and has for its object to provide a very simple device which may be used in connection with any type of air foil surface and which is capable of varying the magnitude of lift from maximum to substantially zero.

In using the word "lift" we have reference to the suction against an air foil surface which is produced by the relative movement of air currents against the air foil surface and the rarification of atmosphere immediately adjacent the air foil surface caused by the deflection of air currents at the leading edge thereof.

A further object of our invention is to provide a device which can be very easily attached to any type of air foil surface such as an air turbine, fan blade, aeroplane propeller or an aeroplane wing.

Another object of our invention is to provide a device of this character which is of very simple, durable and inexpensive construction.

In reference to the use of our device in connection with an air turbine it is our purpose to provide means for controlling the lift on the air foil surfaces of an air turbine to such an extent that the turbine may thereby be allowed to attain a certain predetermined maximum speed of rotation or may be completely stopped.

In connection with the air turbine just mentioned, it may be stated in an explanatory manner at this point that as far as we are aware we are the first to conceive of the application of the air foil surface principle to a wind driven turbine and we have discovered by extensive experiments that a wind driven turbine receiving its propelling power from the partial vacuum created by air currents moving past air foil surfaces is very successful in practice and has a number of advantages not found in other turbines. It is not our intention to claim this particular invention in the present application but on the other hand it is not our intention to disclaim it.

To be more specific, our invention is carried out in a long, shaft-like lip mounted in the air foil surface substantially parallel to the leading edge thereof for movement from a position embedded in the air foil and forming a smooth continuation of the air foil surface to a position where it projects above the air foil surface into the path of air currents moving relative to the air foil surface. In order to obtain the simplicity of construction, smooth operation and ease of control mentioned heretofore, the preferred method of mounting this lip is to mount it for rotation about its own axis in bearings secured to the air foil.

A further object of our invention is to provide a device for controlling lift which is so constructed that it will interfere with the air currents and thereby reduce the lift when projected above the surface of the air foil. We call particular attention to this feature of our invention for the reason that after perfecting our invention, we have discovered certain prior patents in which devices embodying air foil surfaces and auxiliary members attached to said surfaces and adapted to be raised thereabove were illustrated.

In these patents in each case the claim was made for the devices that by moving them to positions projecting above the air foil surfaces they would increase the lift. In this respect, these prior patents purport to accomplish an end directly opposite to that which we have demonstrated to be successfully accomplished in the present invention.

With these and other objects in view, our invention consists in the construction, arrangement and combination of the various parts of our device, whereby the objects contemplated are attained, as hereinafter more fully set forth, pointed out in our claims, and illustrated in the accompanying drawings, in which:

Fig. 1 is a plan view of an air foil surface with our invention attached thereto.

Fig. 2 is a cross sectional view of the same taken on the line 2—2 of Fig. 1, the control device being shown in its position where it allows maximum lift.

Fig. 3 is a similar sectional view showing the control device in position to reduce the lift.

Fig. 4 is an enlarged detail, sectional view of the control device.

We have used the reference character 10 to indicate generally an air foil such as for instance a blade of a wind driven turbine. The illustration may be deemed to cover also such an air foil surface as an aeroplane wing, although the solid section lining shown in Figs. 2 and 3 indicates a solid blade such as a propeller or turbine blade.

The leading edge is indicated at 11, the center of lift at 12 and the trailing surface at 13.

Coming now to the invention herein involved, we control the lift produced on the air foil surface by the currents 17 by means of the lip 19 journalled in bearings 20 secured to the air foil near the leading edge 11 and equidistant therefrom so that the lip 19 will be substantially parallel to the leading edge.

The portions of the lip 19 which are journalled in the bearings 20 are reduced in diameter and are made cylindrical as at 21. The cross section of the lip proper is preferably semi-cylindrical as shown in Fig. 4 in order that the lip may rest snugly at all times against the surface of the groove 22 which is formed in the air foil to receive the lip.

A lever 23 is secured to one end of the lip on a shaft portion 24 coaxial with the shaft portions 21 and is connected to some governing means not illustrated capable of moving the arm 23 in a direction such as to give rotation to the lip.

In the case of a wind driven turbine, an automatic governor is preferably used in connection with a hand control for shutting off the turbine and in the case of an aeroplane wing either a full automatic control, a full hand control or a combination of both may be employed. The governing mechanism forms no part of the present invention.

The lip 19 being semi-cylindrical, one side is therefore flat and when the device is in what may be called its inoperative position as shown in Fig. 2, this flat surface forms a continuation of the air foil surface, allowing the air currents to flow without break to produce a maximum lift against the air foil.

It will be understood that in the case of a wind driven turbine, the wind currents travel in the direction indicated by the arrows 14. Assuming the blade to be under rotation in the direction indicated by the arrow 15, the resultant direction of the wind relative to the blade will be in the direction indicated roughly by the arrow 16. The wind currents will consequently travel as indicated by the dotted lines 17 and the air foil surface will displace the currents in the same manner as the currents are displaced by an aeroplane wing or propeller creating a partial vacuum in the area 18, the greatest area of rarification being near the forward region of the blade and the consequent pull upon the blade being in a forward direction.

The foregoing explanation is given in view of the fact that as far as we know there has been no knowledge disseminated regarding the effect of an air current moving substantially perpendicularly against the flat side of a blade having on its opposite or lee side an air foil surface. We have found from actual tests that a wind driven turbine constructed with the forward sides of its blades absolutely perpendicular to the axis of rotation of the turbine will be rotated by a wind striking said flat faces perpendicularly with as such power as can be obtained in any other turbine or wind mill structure having the same blade area providing that the rotation of the turbine is started by some means other than the lift produced against the air foil surface. As a matter of fact in actual practice we employ a blade which has a slight tilt on its forward face so that the wind will commence the rotation of the blade with an action similar to that against the ordinary flat sheet metal wind mill blade but this statement as well as the foregoing explanation of the theory of operation is made merely in an explanatory manner to show the actual reduction to practice of the present invention in a turbine and we do not intend to claim it in the present application.

By rotating the lip 19 to a position where its forward edge projects above the air foil surface as shown in Fig. 3, the smooth flow of the air currents will be disturbed and eddy currents will be produced somewhat as indicated by the broken lines 25 in Fig. 3. As a consequence, the lift will be reduced.

We have found by actual test that the lift can be so reduced on a wind turbine that the turbine can be completely stopped by this means providing that the forward faces of the blades are not inclined.

The suction produced against the flat face of the lip 19 at the point 26 sufficiently offsets the pressure against the rounded face of the lip by the air currents 17 (as at 27) so as to counteract any tendency of the air currents 17 to lift the lip 19 out of its groove. It will be seen that this is important where an automatic governor is provided in conjunction with the lip since it is desirable that only the force of governor act against the lip intending to rotate it to its series of operative positions.

The engagement of the semi-cylindrical face of the lip against the surface of the groove 22 gives stability to the lip and promotes smoothness of operation. This is important since a tremendous amount of pressure is exerted against the lip when it is in any of its operative positions.

While the device operates most effectively when positioned ahead of the center of lift and fairly close to the leading edge as is illustrated, we have found by experiment that it will also operate as far back as the center of lift indicated at 12. It will be understood, however, that the device functions most efficiently when located fairly close to the leading edge.

Considerable detail has been given as to the use of the device in connection with a wind driven turbine. Its uses in connection with an aeroplane wing or propeller will be no less important. For instance, it may be employed as a stabilizing means for aeroplane wings. The slotted wing now employed is expensive to produce and a wing so constructed is not as strong or efficient as would be a solid wing of the same cross sectional shape and area. Furthermore our invention is much cheaper and simpler to construct than is the slotted wing. Furthermore our device when in inoperative position leaves a perfectly smooth surface free from cracks which would decrease the lifting efficiency and increase the speed resistance of the wing. The device will be as effective in preventing tail spins and stalls as the slotted wing without the accompanying disadvantages.

Some changes may be made in the construction and arrangement of the parts of our invention without departing from the real spirit and purpose of our invention, and it is our intention to cover by our claims any modified forms of structure or use of mechanical equivalents, which may be reasonably included within their scope.

We claim as our invention:

1. In combination with an air foil, a control device comprising an elongated lip normally recessed in the air foil in a position substantially parallel to and near the leading edge thereof and substantially flush with the air foil surface, said lip being mounted for rotation about its longitudinal axis to a position projecting above the air foil surface wherein it will interfere with air currents acting upon the air foil surface in such a manner as to decrease the effective lift of said air currents against the air foil surface, said lip having a relatively small cross sectional area, said lip throughout the majority of its length being substantially semi-cylindrical and the recess in the air foil being substantially semi-cylindrical and affording a bearing surface for the lip.

2. In combination with an air foil, a control device comprising a substantially semi-cylindrical, elongated lip, the air foil being provided with a groove opening into the air foil surface in a position extending substantially parallel to and near the leading edge thereof and the lip being journalled relative to the air foil in a position wherein its cylindrical surface is substantially in contact with the surface of the groove on an axis coaxial with the axis of the groove whereby the lip may be rotated from a position wherein its flat face forms a continuation of the air foil surface to a position where it projects above the air foil surface to interfere with air currents acting against the air foil surface in such a manner as to decrease the effective lift of said currents against the air foil surface.

Signed this 6th day of August, 1930, in the county of Woodbury and State of Iowa.

GERHARD H. ALBERS.
JOHN R. ALBERS.